(12) United States Patent
Sjoblom

(10) Patent No.: US 11,378,485 B2
(45) Date of Patent: Jul. 5, 2022

(54) STRUCTURAL MONITORING SYSTEM

(71) Applicant: Mikael Sven Johan Sjoblom, Napa, CA (US)

(72) Inventor: Mikael Sven Johan Sjoblom, Napa, CA (US)

(*) Notice: Subject to any disclaimer, the term of this patent is extended or adjusted under 35 U.S.C. 154(b) by 0 days.

(21) Appl. No.: 16/944,500

(22) Filed: Jul. 31, 2020

(65) Prior Publication Data

US 2020/0363288 A1 Nov. 19, 2020

Related U.S. Application Data

(63) Continuation-in-part of application No. 15/929,341, filed on Apr. 27, 2020, now abandoned.

(60) Provisional application No. 62/839,422, filed on Apr. 26, 2019.

(51) Int. Cl.
| | |
|---|---|
| *G01M 5/00* | (2006.01) |
| *G01S 17/88* | (2006.01) |
| *G06Q 20/14* | (2012.01) |
| *G06Q 30/02* | (2012.01) |
| *G01S 17/86* | (2020.01) |

(52) U.S. Cl.
CPC ........ *G01M 5/0033* (2013.01); *G01M 5/0066* (2013.01); *G01M 5/0091* (2013.01); *G01S 17/86* (2020.01); *G01S 17/88* (2013.01); *G06Q 20/14* (2013.01); *G06Q 30/0251* (2013.01)

(58) Field of Classification Search
CPC ............ G01M 5/0033; G01M 5/0066; G01M 5/0091; G01S 17/88
See application file for complete search history.

(56) References Cited

U.S. PATENT DOCUMENTS

| | | | | |
|---|---|---|---|---|
| 10,497,250 | B1* | 12/2019 | Hayward | G10L 15/26 |
| 2008/0282817 | A1* | 11/2008 | Breed | G01S 7/4802 73/865.9 |
| 2018/0188712 | A1* | 7/2018 | MacKay | G06N 5/022 |
| 2019/0057169 | A1* | 2/2019 | Santarone | G06T 7/001 |
| 2019/0128771 | A1* | 5/2019 | Santarone | G06F 30/13 |
| 2019/0340908 | A1* | 11/2019 | Wedig | G06N 5/045 |

FOREIGN PATENT DOCUMENTS

WO WO-2018055449 A2 * 3/2018 ........... G01S 7/4863

* cited by examiner

*Primary Examiner* — Stephanie E Bloss
(74) *Attorney, Agent, or Firm* — Stonebridge IP, PLLC

(57) ABSTRACT

The present invention provides continuous monitoring of the attributes of a structure before, during and after an incident. This assessment is delivered within minutes after an incident to the people using the structure. In addition, results from all devices triggered by the event can be aggregated and made available to first responders, governmental disaster management teams and operators of critical facilities.

24 Claims, 12 Drawing Sheets

STRUCTURAL MONITORING SYSTEM

CROSS REFERENCE TO RELATED APPLICATIONS

This application is a continuation in part of U.S. application Ser. No. 15/929,341 filed on Apr. 27, 2020 which claims priority to U.S. Provisional Application No. 62/839,422 filed Apr. 26, 2019, both of which are herein incorporated by reference in their entireties.

BACKGROUND OF THE DISCLOSURE

Field of the Invention

This disclosure generally relates to systems for assessing the structural integrity of a building over time.

Description of the Related Art

Structures of any kind are designed to withstand the forces to which they are exposed and are regulated by various building codes that are enforced by the government. Forces to which structures can be exposed include earthquake, ground motion, wind, vibrations from nearby structures/facilities, explosions, landslides, volcanoes and others, herein defined as 'incidents'. Codes and guidelines are designed to provide a best estimate that the integrity of a structure will survive an incident. However, once an incident has occurred, even if a building is 'built-to-code', it is necessary to make an independent, after-the-fact determination of the extent to which the structural integrity might have been compromised and whether the structure is safe to use.

No currently available device is able to collect data in real-time about the structural integrity of a building. Strong motion instruments are installed in some buildings, but they provide information about the nature of the shaking that has affected the structure, not collecting data from the structure to assess what the shaking has done to that structure.

Some applications have been developed that provide a warning that an earthquake wave is approaching. Another group of apps provides a static analysis of the damage that a hypothetical earthquake might do to a structure in the future. Neither of these types of apps determines what damage has been done to a structure nor do they provide an assessment of whether the structure is likely to be safe to occupy.

SUMMARY OF THE INVENTION

The present invention provides continuous monitoring of the attributes of a structure before, during and after an incident. It then uses a proprietary algorithm further described below to assess how the structure has been affected and whether it is safe to occupy and use. This assessment is delivered within minutes after an incident to the people using the structure. In addition, results from all devices triggered by the event can be aggregated and made available to first responders, governmental disaster management teams and operators of critical facilities.

The present invention uses an array of sensors to monitor the state of a structure continuously, which makes it possible to make an accurate assessment of the condition of a structure over time and, in particular, immediately after an incident. People can then quickly determine if the structure can be safely used. The invention also notifies people that the condition of the structure has changed so that the problem can be fixed to avoid an even greater disaster as well as loss of life.

What is disclosed is a device for detecting and/or measuring the critical components of a structure with a monitoring unit for a designated time period, and defining the designated time period as the lifetime of the structure, comprising the steps of obtaining, timestamping, and recording data acquired from each of the sensors in the device, and calculating an average value for each of the acquired sensor data with the on-board computer device by dividing the total sum of the measured data values by the number of data points in the monitoring sequence, and storing the average data value in the on-board memory component, and when new data acquisitions are made as described above, checking and comparing the new average values with previous values to determine any variations between data values from the same sensor; using the on-board computer device, and categorizing the variation in values and identifying if any sensor value is within or without the pre-determined default value range, whereas if (i) all variation values are within the default value range, the system store the values, and resets as described above, and whereas if (ii) any variation is outside of the default value range it triggers pre-set commands to execute and perform additional operations.

A method for detecting and/or measuring the critical changes in a structure using the device comprising the following steps: the device's on-board computer checks and compares average default values with pre-determined default values that specify minimum and maximum value ranges for each sensor, and that the min/max default value can be defined/changed, manually or using machine learning technology, and that such values may be altered/changed at any time, and if the average values for any sensor is identified to be outside the default value range; a pre-determined command schedule is initiated; whereas (i) an analysis process is executed to determine the situation at the on-board device such as power and communication capabilities, (ii) commands are executed subject to the result of the analysis described above, and (iii) data is provided to an external computing device using Wifi, RF, Bluetooth, Cellular, Satellite and/or manually extraction from the device in order to execute a secondary analysis; and when the average values for all sensors are identified to be within the default value range, the system resets and return to normal operations.

A method to assess structural integrity at a remote data base location using the device, and executing specified operations comprising the following steps: receiving analytic data from the device, including sensor data from an incident acquired before, during and after the incident, and executing a secondary analysis, including (i) uploaded data from the device, and (ii) data acquired from third party databases, and (iii) structural data from the user profile. The relevant data from the structure and around the structure is identified and calculated using a proprietary algorithm, and the result of the analysis is categorized using a pre-determined risk assessment table, and the pre-determined risk assessment table has a selected number of operations subject to the secondary analysis result, whereas each of the (i) low risk, (ii) medium risk and (iii) high risk categories are attached to specific guidelines and recommendations, and this information is displayed at the user profile online and delivered to the user via (a) a mobile application, (b) a web application, or (c) TEXT/SMS, or (d) to a separate server system, or a combination of a thru d.

The above device, whereas the analysis process is made from a computer unit outside the on-board computing device.

The above device, whereas the average values are not calculated as the average value but are used as true values from the sensor data acquisitions.

The above device, whereas the data are not sent from the monitoring unit but processed and analyzed in the local monitoring on-board computing device, or an ancillary computing device at the same location as the object it is monitoring.

The above device, whereas the data indicate there are bodies in the room, the dual communication feature is activated. The person in the room, where the monitoring unit is situated, is able to communicate thru the monitoring unit, with a remotely located person using the communication components in the device.

The above device, wherein the monitoring system includes a means for invoicing a user for services offered by the platform.

The above device, wherein the monitoring system includes a means for services offered as a subscription.

The above device, wherein user interaction with the service is accessed over the network provided by the platform and is tracked so as to record user behavior, how frequently the service is used, and what kinds of key strokes are employed to make use of such service, said record being compiled for feedback and statistics for further software development and for vendor sponsoring activities.

The above device, wherein the virtual environment provided by the platform includes a display area for targeted advertising.

The above device, wherein firmware at individual or all monitoring units at the on-board computing device can be updated and commands can be changed at any time.

The above device, wherein a micro-controlled acoustic sensor is used to record sound waves in the structure which are compared with sound patterns that originate from the breakage of wood, metal, concrete, glass, stone, brick in order to determine damage in a structure;

The above device, wherein the individual LiDAR sensor, and collectively with other sensors, is an essential and integral part of the invention to measure distance.

The above device, wherein the individual gyro sensor, and collectively with other sensors, is an essential and integral part of the invention to measure position.

The above device, wherein the individual accelerometer, and collectively with other sensors, is an essential and integral part of the invention to measure position and acceleration.

The above device, wherein the individual temperature sensor, and collectively with other sensors, is an essential and integral part of the invention to measure temperature.

The above device, wherein the individual smoke sensor, and collectively with other sensors, is an essential and integral part of the invention to measure the presence of smoke and fire.

The above device, wherein the individual passive infrared sensor, and collectively with other sensors, is an essential and integral part of the invention to measure heat signals from bodies.

The above device, wherein the individual carbon monoxide (CO) sensor, and collectively with other sensors, is an essential and integral part of the invention to measure gases Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

The invention is a device [the Monitoring Unit] that uses a number of sensors to record data from measurements of distance, vibrations, sound, heat, gas, light, pressure, humidity, temperature, etc.

Figure 1:
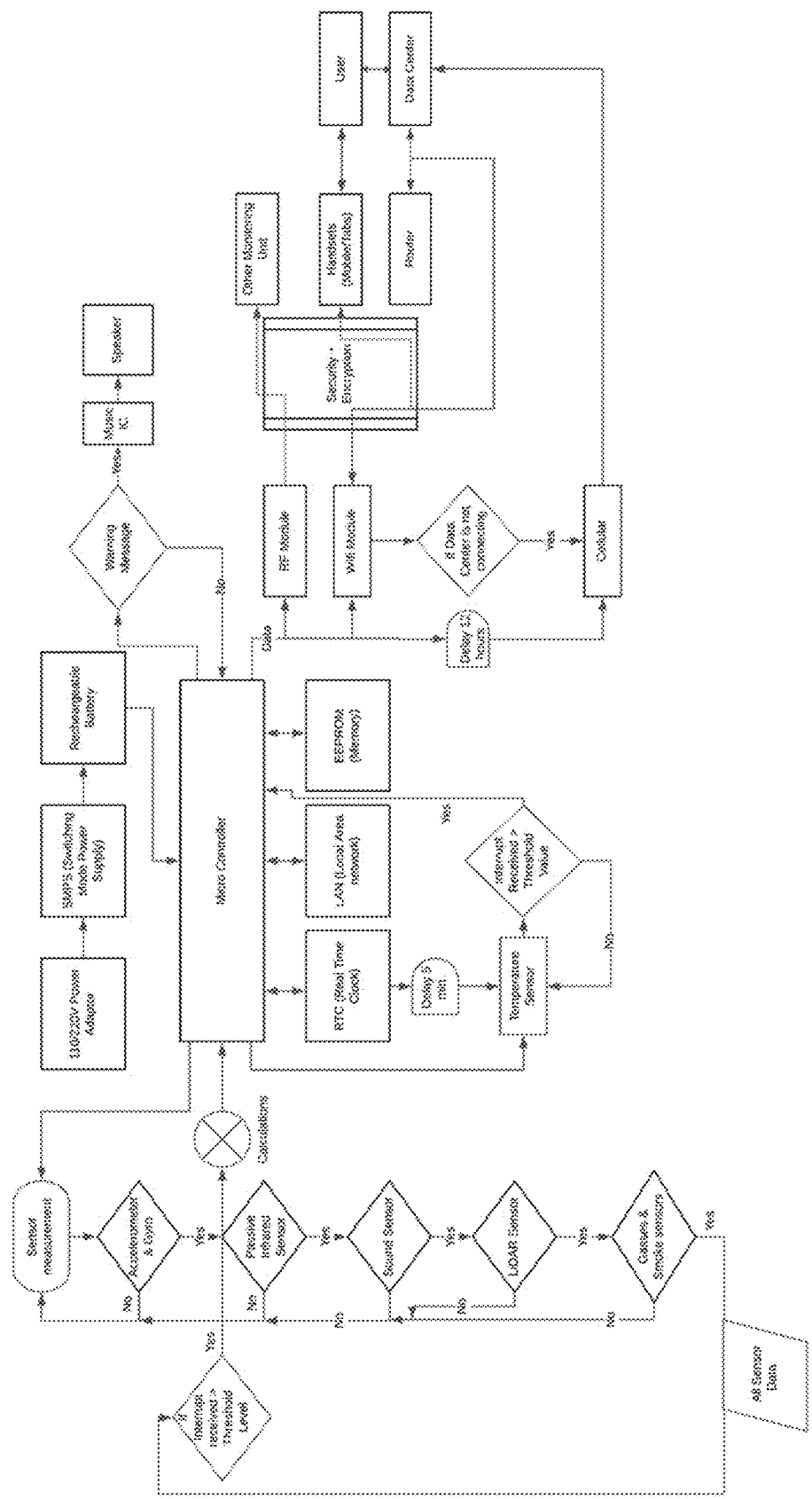
FIG. 1 shows an overview of the invention.

The monitoring unit is attached to a building, bridge, tunnel, or similar structure [the Object] to record data using sensors, as described in FIG. 1, to identify a structural footprint [Default Value].

When installing the system, the user registers the object at a database. Data regarding the object, i.e. age, size, building material, building code, etc. is recorded [Structural Data]. The structural data is used in the final analysis of the object.

Machine learning technology is used to identify a default value for each sensor of the object it is monitoring. Recorded data will be different depending on the hour of the day, the time of the year, the weather conditions, etc. The machine learning technology will enhance the accuracy of such discrepancies in the default values.

Figure 10:
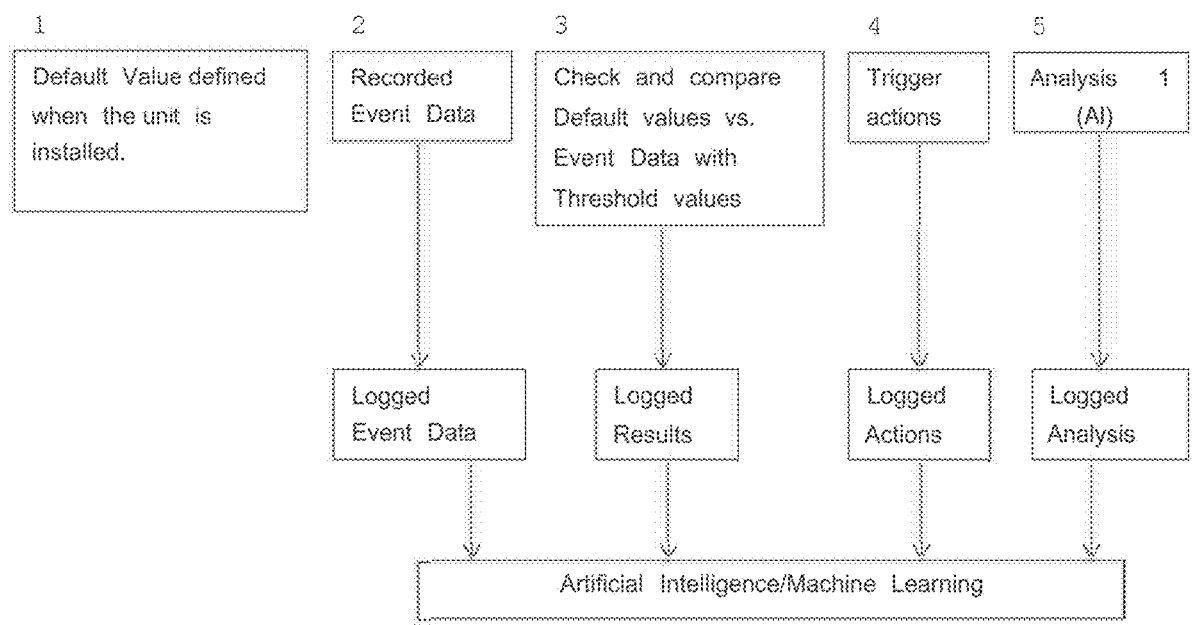
FIG. 10 shows the functionality of the monitoring unit.

The sensors record data from the object, as described in FIG. 1, and detects variations in that data as the object is exposed to normal or abnormal energies/forces originating from wind, earth movement, explosion or material fatigue [Event Values] as described in FIG. 10.

Acoustic Emission Technology [AET] is used to find break sounds of different materials. AET will define the sound pattern and identify if the structure is at risk.

In the event the size of the object is large, the invention includes addition monitoring units. The additional monitoring unit records and processes the same sensor data. The additional mathematical algorithm used in the analysis process is the measurement data between the monitoring unit and the slave unit. This measurement provides another set of data to understand displacement of the object.

The data is analyzed in the monitoring unit. The results are stored in a database in the monitoring unit, and also uploaded to a remote datacenter for further analysis.

The system checks and compares the event values against the default values.

The system checks and compares with third party databases [Environmental Data] i.e. United States Geological Survey (USGS) and National Weather Service (NWS), etc. The purpose of obtaining environmental data is to better understand the conditions around the object (ground and weather conditions), as well as include shake data from governmental seismographs near the object.

When available, data from other monitoring units in the same geographic area are also included in the final analysis of the object.

The final analysis [Object Data] is categorized using pre-determined protocols. The Simple Categorization for standard users is designed using color codes to determine the structural health. The colors are: Green (safe), Yellow (inspection required), Red (unsafe). The Advanced Categorization is designed for professionals, which includes detailed recommendations for determining the structural health.

Protocols are used for different purposes

Retrofit/Upgrade/Repair.

Over time, the object data suggests material fatigue, displacement, or any other type of change in the structure that would indicate that the object may need any type of reinforcement to make sure the structure is safe to use.

Evaluation of Object.

The system can give a buyer, a realtor, a bank, or similar institution a historic record of an Object's structural health, which would be an integral piece of information when an object is appraised.

Evaluation of Building Permits.

The system helps local governments and land-owners to make better decisions, i.e. when approving building permits, creating new policies and building codes, and anything in connection with safety standards of structures, identified at specific geographic locations or objects.

Evaluate Infrastructure.

The system helps local governments and owners of infrastructure to monitor and safeguard larger objects, i.e. gas, oil and water pipelines, electric distribution lines, oil refineries, windmill power plants, bridges, tunnels, rail, etc., in relation to geological movement.

Post Natural Disaster Evaluation.

In the event that the object is exposed to any type of strong motion, the user/owner of the object will receive an indication immediately after such event about the safety standard of the object.

Post Explosion Evaluation.

In the event that an object is exposed to a nearby or direct explosion, the user/owner of the object will receive an indication immediately after such event about the safety standard of the object.

Post Fracking and Similar Man-Made Events.

In the event that an object is exposed to a fracking event and/or similar Man-Made events, the user/owner of the object will receive an indication immediately after such event about the safety standard of the object.

Each of the 7 categories above uses a proprietary mathematical algorithm to automatically determine if the object has been structurally compromised and/or displaced. The result is delivered via SMT/TEXT, email or phone to the user/owner of the object, as described in FIG. 3. In additional to these methods, the result can be delivered to a separate computer server system or in a combination with these methods.

At certain geographic areas, structures are constantly exposed to vibrations and motion from natural causes (seismic and weather conditions, etc.), as well as nearby Man-Made infrastructures (airports, roads, etc.) This exposure wears the building materials down over time [Wear and Tear]. Currently, there is no technology determining the condition of the wear and tear factor in a structure when it is constantly exposed to such energies and forces. The wear and tear of materials will, over time, change the structural health and eventually compromise safety of the structure. The invention offers a new layer of data that will indicate "wear and tear" changes that will be instrumental to uphold the safety of structures over time.

Currently, there is no technology determining the condition of a structure when it is going change hands or undergo evaluation. Structures are exposed to daily and/or extraordinary forces which in both long and short term wear the building material down. A structural engineer making a physical inspection can only use his vision to assess if a structure is safe or not. These current inspections do not have any actual or real historic data to compare results with, in order to determine the condition of the structure. This invention offers a new layer of data that will help determine both value and safety of a structure. In addition, this invention understands the inside of building materials in such a way that a visual inspection would never see.

Currently, when an object is exposed to forces explained above, and the object is situated in a populated area, the local authorities immediately close the objects for safety, until certified engineers have examined and classified the structure/object as safe or unsafe. Engineering teams must visit the structure/object when making this classification. During a geological incident, a large number of structures/objects are often affected. The great number of structures/objects in relation to the fewer number of certified engineers is a skewed ratio, making the process of safety classification time consuming and tedious. The longer time it takes, the more financial loss is expected for the society affected, and the risk for casualties increases.

The invention uses a hardware unit that monitors if and how much an object is affected by an incident described above. The analytic software system automatically determines if the structure/object is safe or not, using the data obtained by the sensors and transformed into mathematical algorithms. This will create an immediate alert system and increase public safety and safety for first responders. This invention is also a tool for first responders to better understand if an object is safe to enter after an incident. In addition, local governments will have a tool to better and quicker categorize where to direct actions to help people, and to prevent further injuries and casualties. The system categorizes the objects from most dangerous to safest within minutes after an incident.

The individual components or elements that make up the invention

A LiDAR sensor to measure displacements;

an accelerometer to measure ground motion;

a piezo-electric device to detect acoustic emissions;

gas and smoke detectors;

a temperature sensor;

a passive infrared sensor to determine if there are warm bodies in the room;

a radio frequency device for communication between multiple devices that are connected in a network (the RF is also identifying distance between the monitoring units to detect displacement);

a speaker to sound alarm and pre-recorded sounds, in other words also enable dialog communication;

a cellular communication system with battery backup;

a Wi-Fi system for communication with a remote data center; and/or a gyro compass to identify rotations.

Each component of the device is described herein, which further defines the invention and its functionality. Any references to 'Standard Mode' describe the mode within the monitoring system which collects data from the structure without any extraordinary or abnormal forces impacting it. References to "Incident Mode" describes the monitoring system when it has been triggered by one or several factors that are identified as impacting values outside of the pre-defined threshold values. The threshold values are defined either in the monitoring system's factory setting, or upon installation The Light Detection and Ranging Sensor [LiDAR]

LiDAR uses a laser to determine the distance between two set points within the structure. Point A is located on the wall on which the monitoring unit is installed; Point B is opposite the device on the other side of the room/space within the structure. To put this another way, Point A and B can be between any object, inside or outside. The data gathered between the points is compared to new and historic readings to define any change in distance. The data is also utilized by machine learning technology to understand the variations in distance dependent on time of day, time of the year, weather conditions, etc. The data is also used in correlation with other sensor data to further improve data analytics.

Trigger: The LiDAR triggers the system into Incident Mode when the acquired data is outside of pre-determined threshold value(s). The threshold value varies from object to object, and from time to time. The machine learning system will continuously adjust the threshold value as new data becomes available (daily). The relation between the temperature sensor, the building material of the object found in the structural database, the time of the day, and the time of the year will all be included in the determination of distance discrepancy.

Standard Mode: Data acquisitions are executed multiple times per day as described in 'The System Modes'.

Incident Mode: Data acquisitions are executed when the accelerometer data returns values that are outside the accelerometer threshold value.

Accelerometer and Gyro

A 3-axis accelerometer measures motion and also determines position using a gyro compasses. The default position is established when the monitoring/sensor unit is installed on the wall within a structure and the system is switched on. The accelerometer monitors and records vibrations 24/7. The recordings are stored and calculated, and using machine learning technology, the system establishes the correct default value, in other words the default value. The data are also used to understand the variation of distance depending on time of day, time of the year, weather conditions, etc. In addition the system also understand vibrations and rotations. The data is also used in correlation with other data sensors to further improve data analytics.

Trigger: The accelerometer triggers the system into Incident Mode when the acquired data is outside of pre-determined threshold values. The threshold value varies from object to object, and from time to time. The machine learning system will continuously adjust the threshold value as new data becomes available daily.

Standard and Incident Modes: Data acquisitions are continuously monitored and recorded as described in "The System Modes".

Gas and Smoke Sensors

The system includes sensors that detect smoke from fires, as well as various gases, such as carbon monoxide (CO), hydrogen cyanide (HCN), carbon dioxide (CO2), and hydrogen chloride (HCl). The sensors detect gasses at all times and trigger the system immediately when levels exceed pre-determined threshold values. The sensor values are not recorded or stored unless one or several are triggered.

Standard and Incident Modes: These sensors are trigger-sensors only.

Temperature Sensor

The temperature sensor monitors and records Celsius/Fahrenheit 24/7. The recordings are stored and cross-referenced with the gas sensors to identify risk levels of explosion. The recordings are cross-referenced with the LiDAR and RF that monitors distance calculations. Distance may change due to expansion/retraction of a structure. In other words, change of distance may break gas lines and increase risk of explosion.

Passive Infrared Sensor (PIR)

When the system enters into the Incident Mode, it activates the PIR sensor to identify if there are any warm bodies in the room. The PIR sensor cannot identify if the body is human, an animal or anything else that may be detected as a heat element similar to a body. The sensor values are not recorded or stored unless one or several of the sensors are triggered. These sensors are trigger-sensors only. In the event that PIR data detects heat elements, the data is cross-referenced with simultaneously acquired sound data. The system will identify whether or not the combination of the heat-element and sound recording data can be attributed to a human or something else.

Standard and Incident Modes: This sensor is a trigger-sensor only, at all time

Radio Frequency (RF)

When more than one device is required for an installation, RF is used to triangulate the positions and identify the distances between each sensor. This is part of the assessment of placement and displacement of the object.

Trigger: The RF triggers the system into Incident Mode when the acquired data is outside of pre-determined threshold values. The threshold value varies from object to object, and from time to time. The machine learning system will continuously adjust the threshold value as new data becomes available daily. The relation between the temperature sensor, the building materials of the object found in the structural database, the time of the day and the time of the year will all be included in the determination of distance discrepancy.

Standard Mode: Data acquisitions are executed multiple times per day as described in "The system modes".

Incident Mode: Data acquisitions are executed when the accelerometer returns values that are outside the pre-determined accelerometer threshold values.

Sound Card

The system uses Acoustic Emission Technology [AET] to identify various breakage-sounds from different materials that make up the structure. The Structural Database identifies what building materials is present, which enables the system to find breakage-sounds associated with that particular material. This AET may or may not be used in the final assessment, subject to privacy and/or other factors.

The relationship of the PIR sensor with the sound card, which is used to identify people in the room, may also be utilized as a dialog parameter. During an Incident Mode, there may be people that are unable to escape the area.

Speaker

The speaker will be used for any type of warning signals, pre-recorded voice messages, or in a dialog situation with people in the room.

Wi-Fi

The standard communication used in the system leverages WiFi. The system uses the local WiFi infrastructure to setup, install, control, and run the system.

Cellular

The backup system is cellular. In the event of a power outage or general lack of power to the system during an Incident Mode, the cellular capabilities will be activated to communicate with the remote data center.

Battery Backup

In the event that the AC/DC power is not available, the system uses its battery backup system to continue monitoring and communicating as it was designed to do.

In the event the unit must be moved, the monitoring unit can be switched off manually by selecting the off-line mode The invention makes continuous and periodic measurements over a recording interval, typically of a few minutes duration. If all sensors record data values within a pre-determined range of values [defined normal range], the device executes calculations to (for) the average value for each sensor, stores it and then uploads those values to the data center. The recording sequence is then deleted and a new recording sequence initiates without delay or stop.

If any sensor detects data values outside the normal range (i) the device checks if AC/DC power is active, and if power is inactive then the backup battery unit is activated, (ii) then the device checks if WiFi is active, and if it is inactive then the alternative communication components are switched on to communicate with the remote data center, (iii) then the recording sequence for all sensors is uploaded in full to the remote data center, (iv), then a local analysis is made at the device, and result is uploaded to the remote data center, (v) then the remote data center executes calculations and acquires data from; (a) the device, (b) third-party databases, (c) any custom database. A final result based on these calculations is used to determine the condition of the monitored object; and this result is relayed to the user as (i) a text message, (ii) an email, (iii) a voice message, or (iv) a customized data-set to an outside network of computers. The invention log, archive and time-stamp all data. This process continues until all sensors are back in the normal range.

All illustrations of the drawings are for the purpose of describing selected versions of the present invention and are not intended to limit the scope of the present invention.

FIG. 1 shows an overview of the invention. In reference to FIG. 1, the present invention is a method of determining structural integrity. The invention consists of (a) a monitoring hardware system that includes one or several of sensors for obtaining data from the object it is being monitored, FIG. 8, and (b) a software operation system that uses artificial intelligence technology and logic to identify, check and compare structural information using an analytical process in order to understand changes in the values of structural elements, and (c) a hosting system located at a remote data center that provides access to online usage of software, consisting of one or more servers that provide a platform for a virtual environment, the platform being remotely accessible over a network by multiple simultaneous users, and (d) a logic board, including mathematical operations using algorithms and machine learning technology to process the analyses (See FIG. 12), and (e) a communication module to relay messages and recommendations from the analyses to the user.

Figure 2:
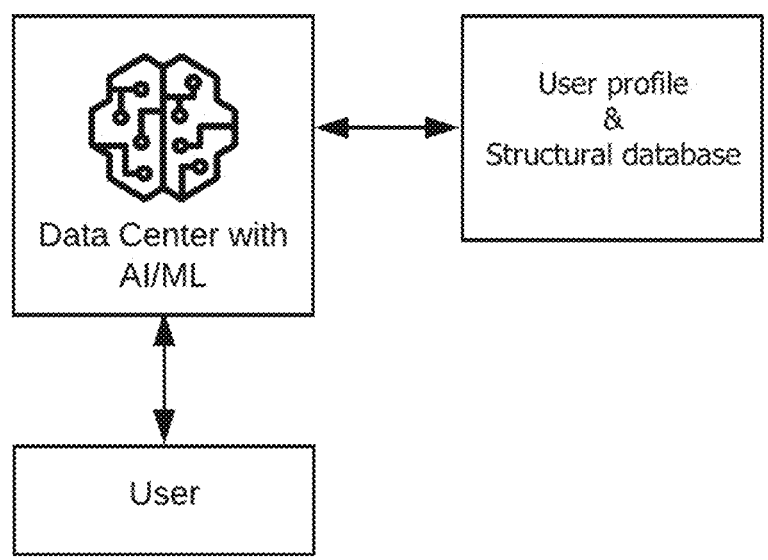
FIG. 2 shows a structural database.

FIG. 2 shows a structural database. In reference to FIG. 2, the user of the invention will provide contact details and structural data in a registration process before using the system. Data is stored in a user data base. The database consists of (i) contact information about the owner, manager, user and any other person that is connected with the structure, and (ii) architectural information about the structure, including building material, age, size, etc., all of which are an integral part of the structural assessment.

Figure 3:
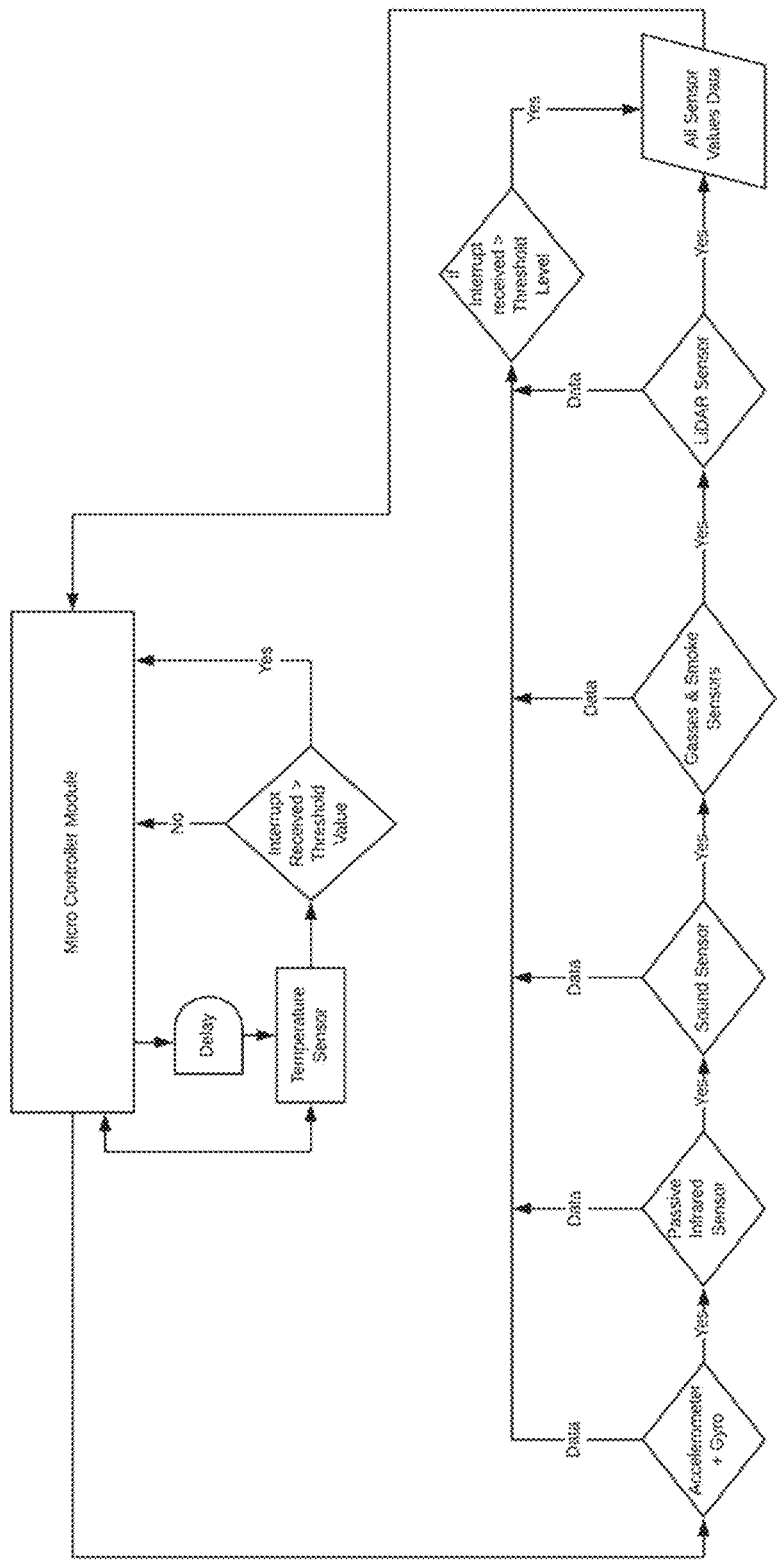
FIG. 3 shows device/monitoring unit sensors.

FIG. 3 shows device/monitoring unit sensors. In reference to FIG. 3, the invention includes a hardware monitoring unit that uses various sensors that identifies acceleration, decibel level, Celsius/Fahrenheit temperature, millimeters of displacement, angular rotation, dangerous or noxious gases, presence of smoke, and heat-signals from bodies. One or several monitoring units can be used parallel if the footprint of the structure is large. At the time the monitoring unit is installed at the structure, the unit is connected to the hosting system service at a remote data center, using wireless or wired communication via a router thru the internet, or satellite communication, or cellular communication.

Figure 4:
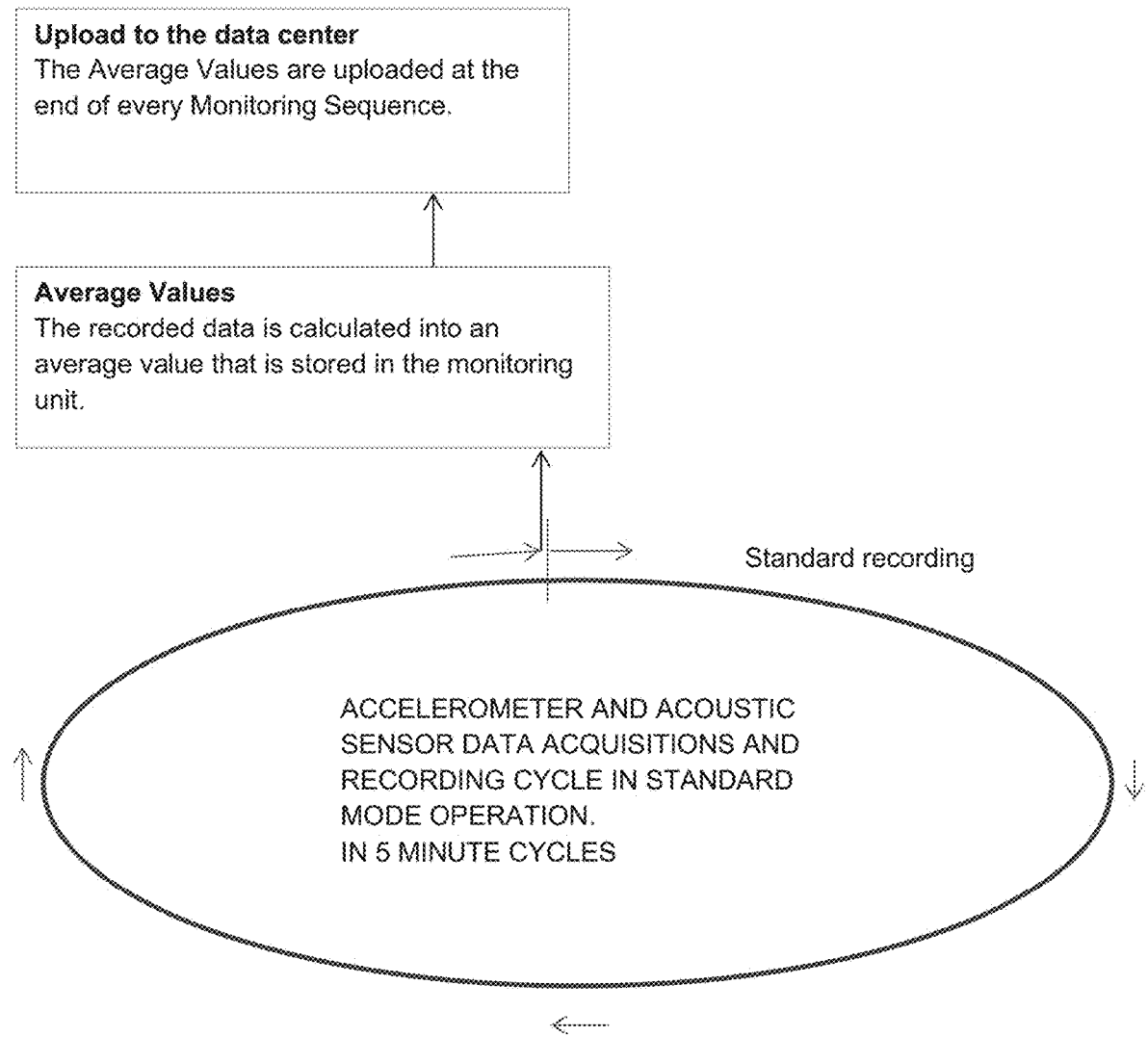
FIG. 4 shows standard recording and data acquisition.

The first data acquisition is used to obtain and store the initial default values of the structure. Software updates can be downloaded and installed remotely from the data center at any time. All or individual monitoring units can be modified with respect to default values and/or the frequency of data acquisition, recording and upload. FIG. 4 shows standard recording and data acquisition. The sensors in the monitoring unit execute data acquisitions on a daily basis following a pre-defined schedule, as described in FIG. 4. A standard recording will continue non-stop 24/7.

Each sensor executes and calculates true and current default values of the structure and stores it in the monitoring unit. Data is always processed using machine learning standards, and in the event a default value needs to be adjusted it does so automatically. In standard monitoring mode, the analysis of data is executed in the monitoring unit to determine if a single anomaly is present or relation-based anomalies between the sensors are involved. If all data points are within default value range, the system continues its routine standard monitoring schedule.

Figure 5:
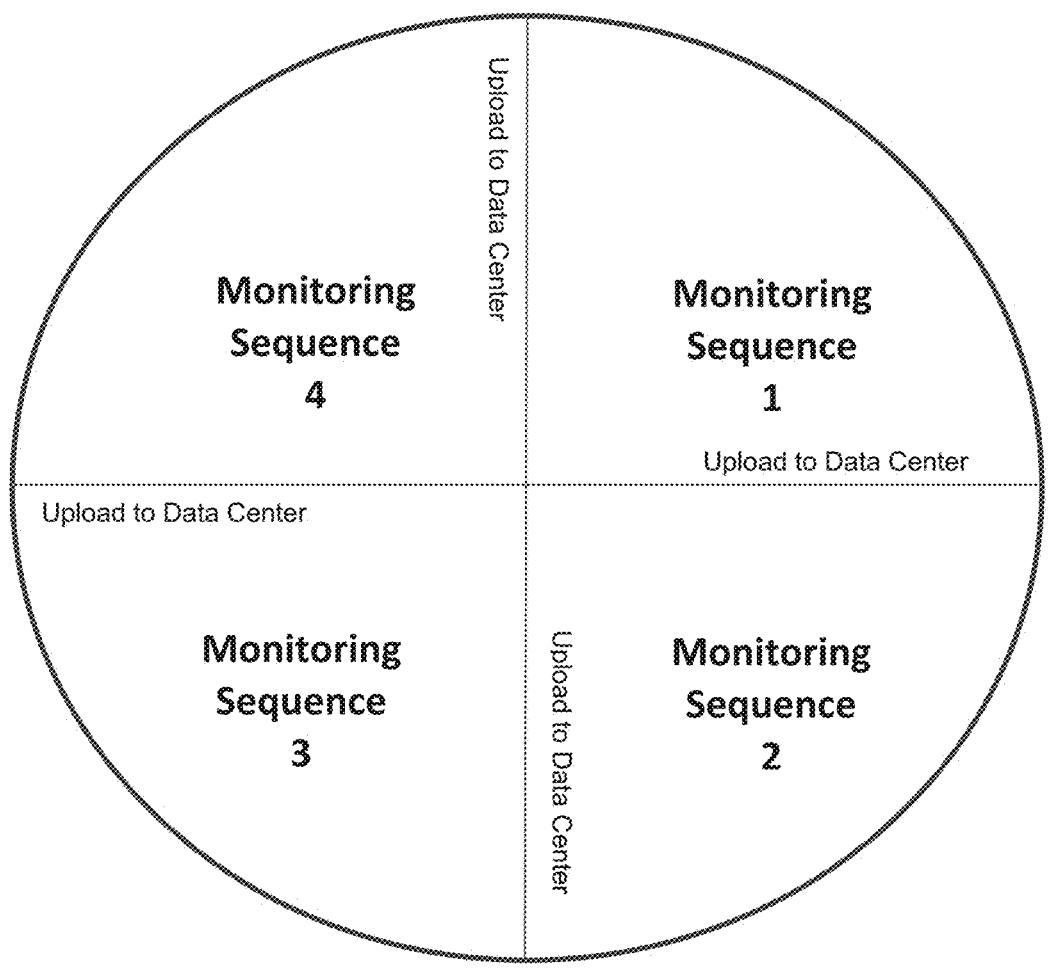
FIG. 5 shows upload schedule from monitoring unit to data center.

FIG. 5 shows upload schedule from monitoring unit to data center. In reference to FIG. 5, the results are stored in the monitoring unit and uploaded to the data center. Forces that shake, rattle, move, or in any other way alter the original state of the structure are immediately identified. If data from any sensor, or a combination of sensors in the monitoring unit indicates an incident, and/or the data are outside the default value range, at any time, the system is activated into incident mode.

Figure 6:
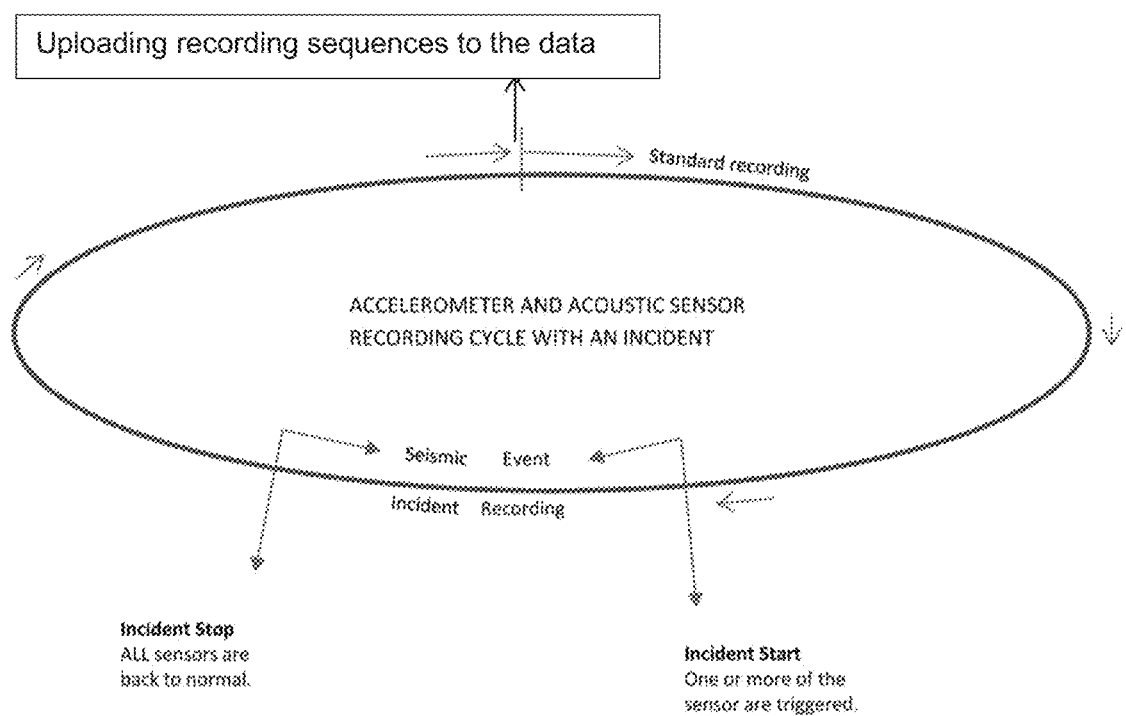
FIG. 6 shows incident recordings.

FIG. 6 shows incident recordings. In reference to FIG. 6, the system is triggered using variables that indicate an incident is happening.

When an incident occurs, the standard recording switches over to incident recording. A first analysis is made in the monitoring unit. The resulting analysis and the recordings are uploaded to the remote data center.

Subject to the triggering factor of the invention, (i) commands will activate the speaker system and execute warning sound and pre-recorded voice messages, (ii) a dialog feature may be activated to communicate with people in real-time that are in distress. The incident monitoring schedule continues until data returns to its default value range. During an incident, the invention obtains recordings using acoustic emission technology which can identify breaking-sounds in the structure. The incident creates a 'ping' in materials that can be used to recognize the breakage of different types of material. Recordings are uploaded to the data center for analysis.

Incident recording: a recording that starts when the system is triggered and continues until the default values are back within range again. Incident process: regardless of where the standard recording process is in the cycle, if one or more sensors indicate values outside the default value range, and trigger the system, the incident recording process begins and continue to record until the default values are back within range again, with an additional recording time to include the post-event data acquisition. Upload: the entire recording is uploaded to the data center.

Figure 7:
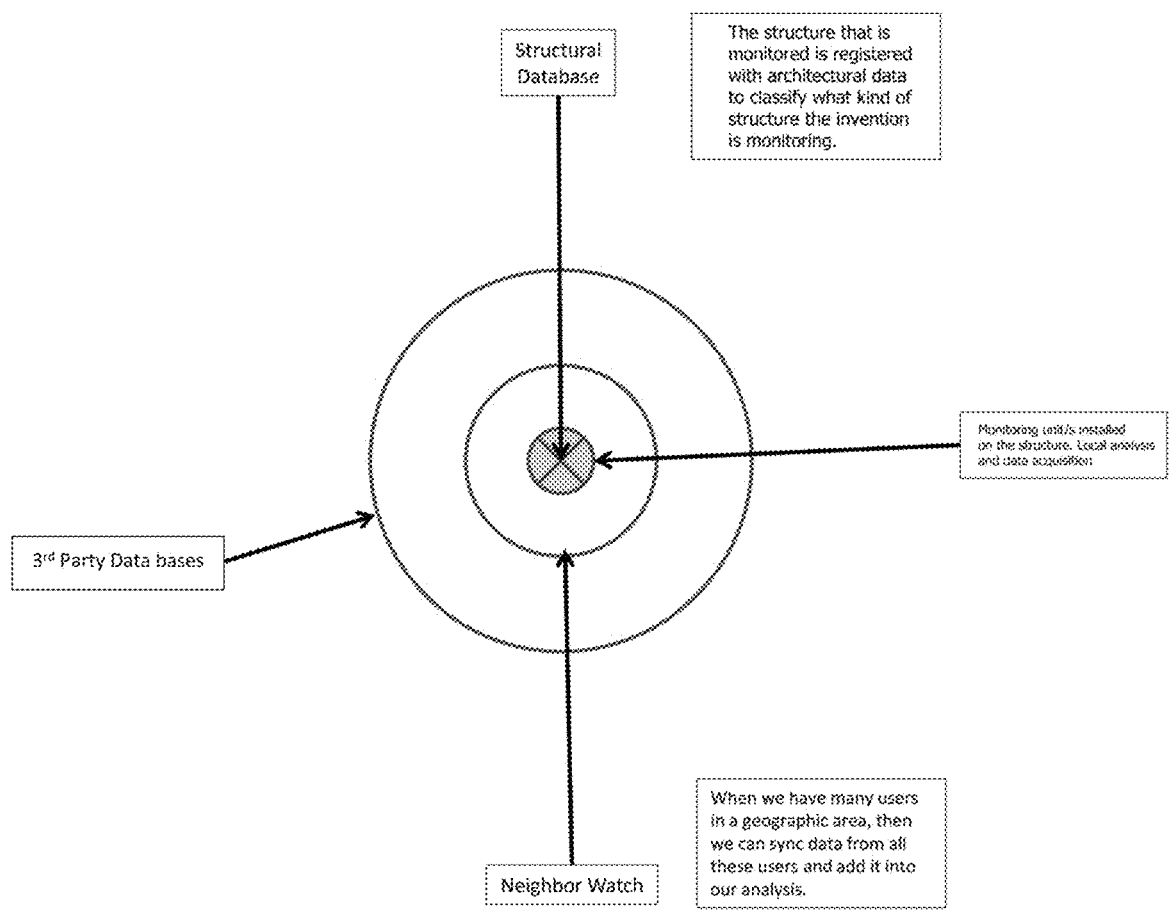
FIG. 7 shows data center analysis.

FIG. 7 shows data center analysis. In reference to FIG. 7, the invention executes a second analysis of data in the data center. This analysis includes individual structural data, data from the local monitoring unit and third party databases that can be used to understand what kind of forces and environmental impacts the structure has experienced. The result of the analyses will trigger pre-determined recommendations to the user of the system. These recommendations will be delivered via TEXT messages and emails immediately after the incident. They will also be displayed online at the user profile at all time. This feature will be valuable for anyone wanting to understand the organic progression of a structure with regard to time and environmental exposure.

Figure 8:
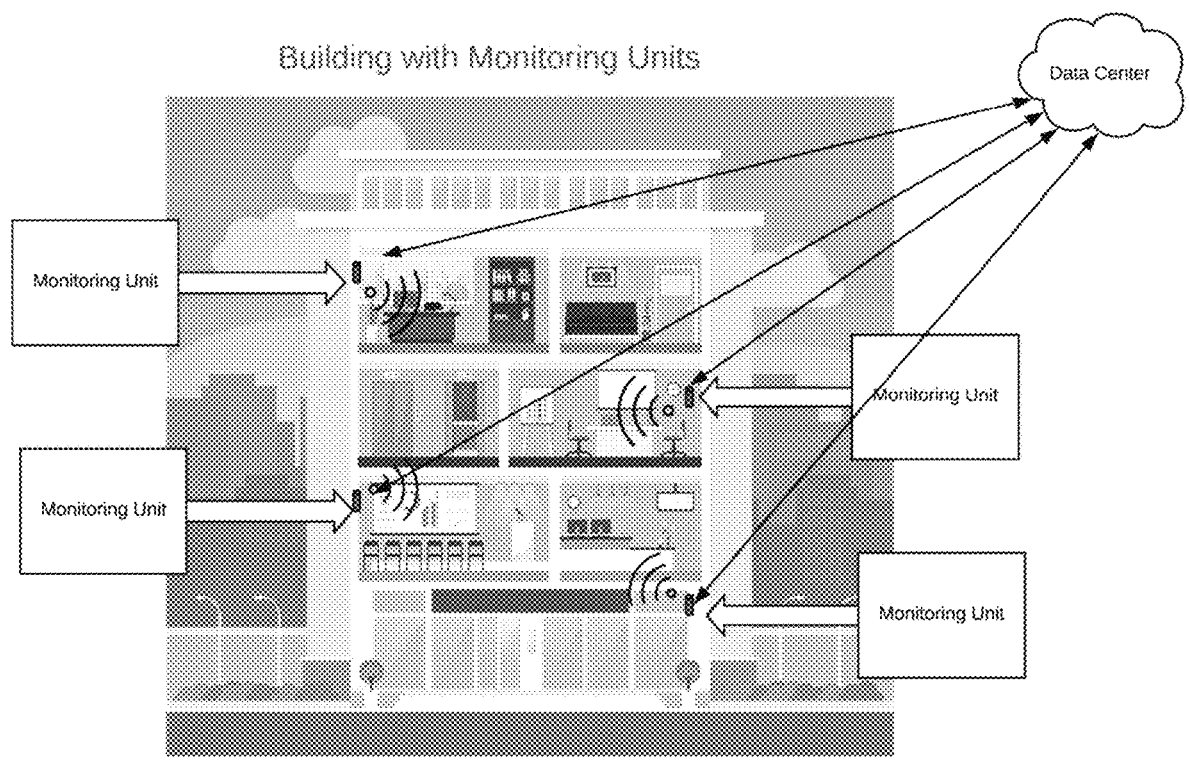
FIG. 8 shows multiple monitoring units.

FIG. 8 shows multiple monitoring units. If the structure is larger, multiple sensor monitoring units may be required. FIG. 8 shows a suggestion of how such larger buildings would be monitored.

Figure 9:
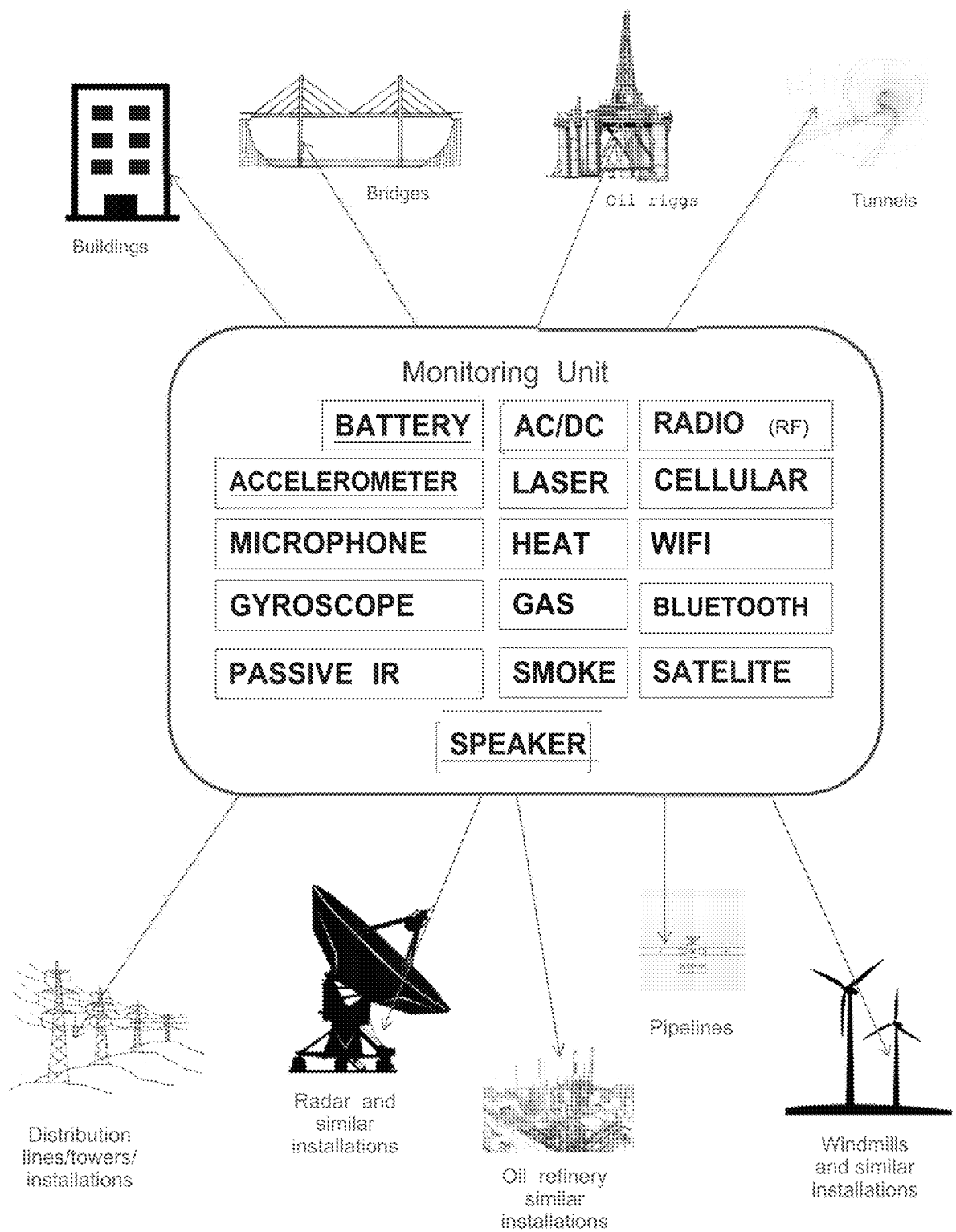
FIG. 9 shows the specification of the monitoring unit.

FIG. 9 shows the specification of the monitoring unit.

The hardware uses 8 sensors to obtain data from the object it is monitoring. The number of sensors does not limit the invention. There may be more or less sensors depending on where the monitoring unit will be installed. Examples are specified under the headline "protocols . . . for different purposes". The sensors are monitoring:

| | |
|---|---|
| Accelerometer | acceleration and velocity |
| Gyroscope | direction of movement |
| Laser | distance measurements |
| Microphone | Acoustic Emission Technology |
| Heat | fire |
| Gas | gas |
| Smoke | smoke |
| PIR | Passive infrared |

The unit includes communication technology, memory, and processing power. The unit is powered by AC/DC including a battery backup system.

The unit includes a speaker system if and when a siren or spoken message is delivered at the place the monitoring unit is placed.

The invention is designed to monitor any type of structural object to identify placement and displacement. The combination of these components represents a new electronic monitoring system.

FIG. 10 shows the functionality of the monitoring unit.

Data is constantly recorded and variations in the data are detected as the object is exposed to normal or abnormal energies/forces originating from wind, earth movement, explosion or material fatigue [Event Values].

Figure 11:
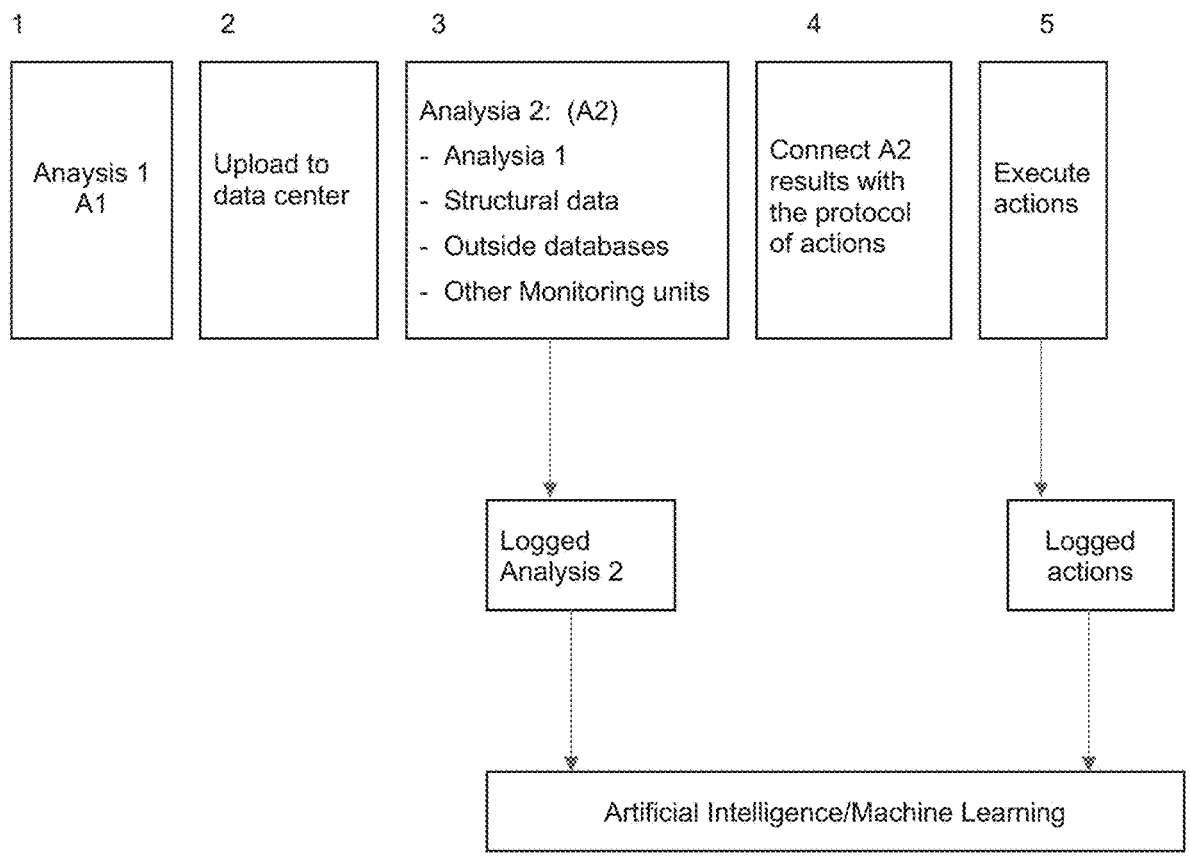
FIG. 11 shows the analysis process.

FIG. 11 shows the analysis process.

The Monitoring Unit: Data from each sensor is analyzed. Each analytic result is compiled in an overall analysis of the object.

The Data Center: Data from a number of internal and external databases are compiled and used in the final analytic processing of the object.

Classification: The data is classified and connected with pre-selected messages that are delivered to the user/owner of the object.

Figure 12:
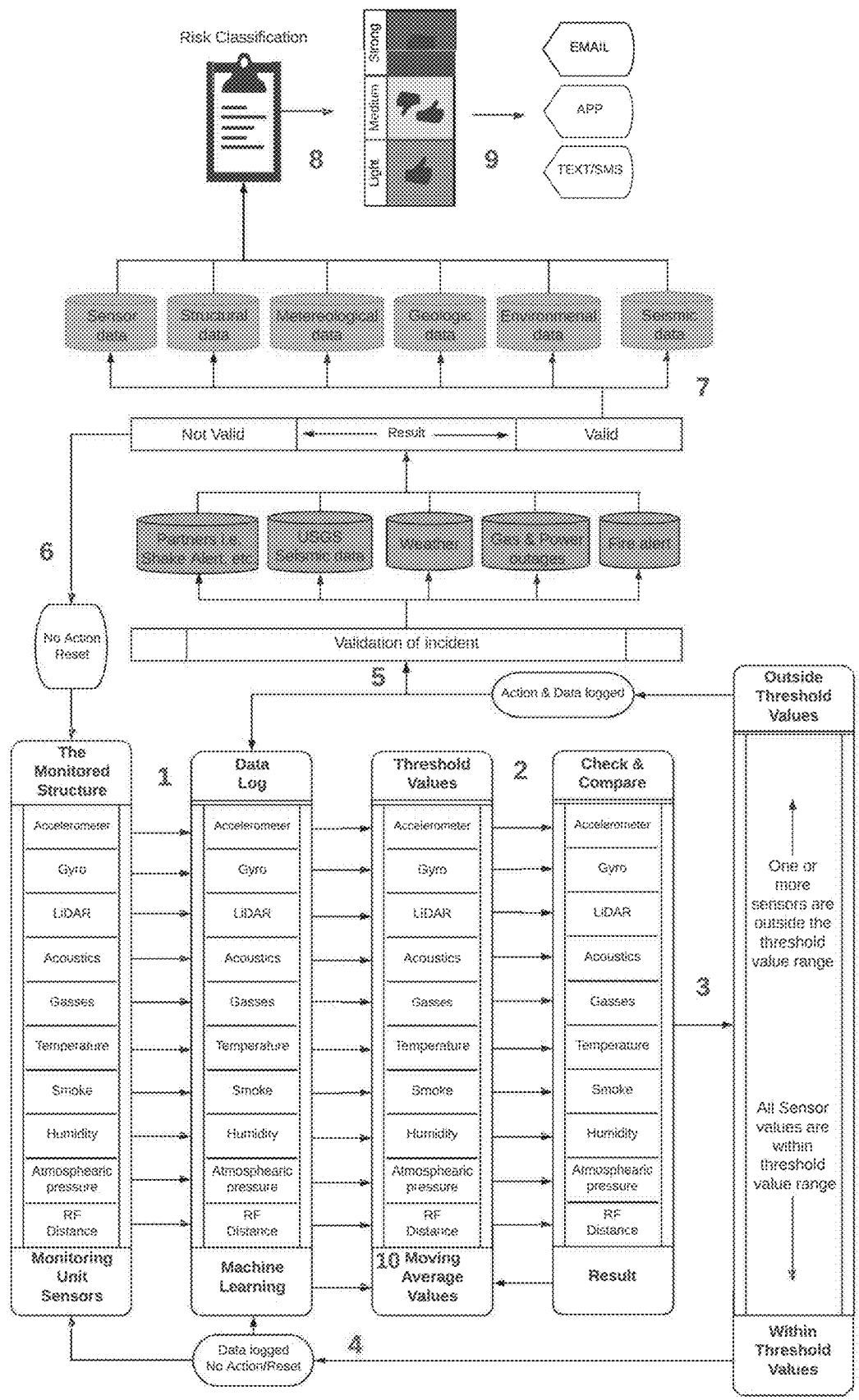
FIG. 12 shows one example of an algorithm to assess how a structure has been affected by an incident.

FIG. 12 shows one example of an algorithm to assess how a structure has been affected and whether it is safe to occupy and use.

In FIG. 12:

1: The monitoring unit attached to the structure records data following a data acquisition protocol. Data is logged in the system.

2: The logged data and the threshold data, for each sensor, are checked and compared.

3: The algorithm identifies if the logged data is within or outside the threshold value range.

4: If all sensor values are within the threshold value range, the system is reset, and no actions/triggers are activated in the algorithm.

5: If one or several sensors are outside the threshold value range, the system is triggered and moves to the validation protocol. The system queries outside databases to see if the structure has been exposed to an incident that would trigger the system.

6: If the validation protocol yields a negative result, the system is reset, and no further action is needed.

7: If the validation protocol yields a positive result, the system analyzes data from the monitoring unit as well as from databases outside the structure to categorize each dataset according to a pre-determined risk classification database.

8: The individual risk classifications are synthesized into a risk classification report that includes individual recommendations and warnings.

9: The system delivers the information to the user by risk classification category.

10: Every data acquisition is logged and used by machine learning technology to create a revised threshold value that is individually customized for the object that is monitored. The system calculate the moving average for a predetermined number of days (Y), using simple moving average, or central moving average (AI+A2 . . . +AX) Y days.

If the invention is used in multiple structures in a geographic area, the results may be delivered as a prioritized list of structures sorted by risk class, size, etc. These results can be posted to official or unofficial databases to indicate risk classification to first responders. The results can also be made available to anyone who wants to understand the risk classification of certain public buildings, i.e. schools, hospitals, airports, train stations, etc. The results will also indicate where people may be in an emergency situation. The invention can identify exactly where someone was located at the time the incident happened. This information can be relayed directly to first responders. The result can also trigger call-to-action responses in other computerized systems, such as electrical grid systems, nuclear power plants, etc.

The long-term result of standard and incident analyses can be used to (i) assess material fatigue of a structure, (ii) recognize the occurrence of incidents affecting a structure over time, for use in real estate transactions, insurance underwriting and bank evaluations, or any other type of risk assessment of a structure, (iii) assessments in connection with architectural permits and/or building codes.

On Jul. 4, 2019, a 6.4 earthquake hit Ridgecrest, Calif. It was felt all the way to San Francisco. Residents and local government immediately started to deal with the aftermath of a natural disaster. People went back into their houses and thought it was over.

On Jul. 5, 2019, a 7.1 earthquake hit Ridgecrest, Calif. This main shock occurred 24 hours after the strong foreshock. Structures that were hit the first time were now seriously compromised and the second hit was devastating.

The following week over 1,000 shocks were recorded in Ridgecrest, Calif.

This is a typical scenario which puts people at risk since they don't know if there will be a strong motion event again soon, and if their house is strong enough to take another hit without collapsing over them.

The electronic design and layout of the invention is made on a standard printed circuit board (PCB) based on the Gerber format. All components used will be carefully tested before the PCB assembly (PCBA). The industry PCBA standard is used to manufacture the PCB. The circuit board is tested and quality controlled, as is the functionality of individual sensors. The PCB is then assembled in the plastic box that is made for the product. Once assembled, the product is tested for functionality, and packaged. The package contains an installation and user manual.

Each sensor in the above invention is necessary to facilitate accurate assessment of structural integrity. The machine learning technology improves the performance over time as more data is acquired from the structure. The more monitoring units that are installed at a structure, acquiring more sample data for the analysis of the structural behavior, the better the risk analysis that can be created.

If distance measurement components are replaced with other types of measurement components to identify placement and displacement, the analysis would produce the same and/or better result. If acoustic sensors would be replaced with other types of acoustic sensors, the analysis would produce the same and/or better result. If the invention would be built into other types of equipment, mobile or stationary, it would produce the (same) and/or better result.

The user will download, install, and register at a mobile application from a remote data center. The device will be registered using the mobile application. The user will mount the device at a high position on an interior wall of the structure. In addition to this, If the user decides to use two or more sensors, then at least one sensor should be installed at a low position on an interior wall of the structure. The device will initiate a set of mechanical self-checks to assure correct installation. The invention will initiate communications with the remote data center which would conduct a series of functionality tests. In addition, the user would be asked to provide information about the structure (type, age, materials used, etc.) as well as the names and contact information of relevant parties. The device is now executing its operations without any user interactions.

After an incident, and if the data recordings indicate sensor data outside the default value range, the user would, within a few minutes, obtain the analysis of how the incident affected the structure, including a recommendation and guidelines about the safety of the building. If the analysis concluded that the building was safe, the user could enter the building and resume regular use. If the analysis found that serious structural damage had occurred, the user would be advised to remain out of the building and seek help from a professional engineer. There is also the intermediate case where the analysis indicates that damage might have occurred. In this situation, the user would be given a careful explanation of what had been found, its uncertainties, and suggestions for how to proceed.

Results from all devices triggered by an incident would be aggregated and can be made available to first responders so that they could understand the risk level before entering a structure, and to governmental disaster management teams so that they could begin planning the government response. The information would also be made available to operators of critical infrastructure and facilities so that they can better manage resources and safety issues after an incident. In addition, the result can be delivered as numeric values into third party computerized systems, rather than a text message. These numeric values can trigger other systems to execute commands of various kinds.

In addition, the data acquisitions made before, during and after an event can be delivered as complete data recordings to insurance companies, local governments, first responders, emergency agencies, etc. to understand what happened to the structure in connection with the actual natural disaster event.

The system can also be triggered by third party databases. Examples of third party databases are from USGS, ASCE, QCN, NWS, NEIC, or any other third party system, recording events from natural disasters. If the system is alerted from any of these third party databases about an incident, and the incident is outside the threshold value range, then the monitoring unit can be activated (triggered), unless not already triggered from its own sensors.

Additionally, when the structure is monitored non-stop, long-term, the system detects material fatigue as a result of small and large vibrations, caused by environmental conditions including natural phenomena of various kinds. Over time, a structure will change its disposition and if this change is outside a threshold range, the system will be triggered and alert the user.

While this disclosure includes specific examples, it will be apparent after an understanding of the disclosure of this application has been attained that various changes in form and details may be made in these examples without departing from the spirit and scope of the claims and their equivalents.

I claim:

1. A method for measuring the structural integrity of a structure after a natural disaster affecting the structure comprising:
  each day, on one or multiple occasions, obtaining and recording data acquired from a LIDAR sensor positioned on the structure to measure distance data between two or more points, a gyro sensor, an accelerometer positioned on the structure to measure vibration data in the structure, a temperature sensor, a smoke sensor, an infrared sensor, and a gas sensor, with a monitoring unit in communication with each of the sensors and comprising a computer device;
  analyzing and calculating an average value for each of the acquired sensor data with the computer device by dividing a total sum of measured data values by a number of data points;
  storing the average data value in a memory component of the computer device;
  checking and comparing new average values with previous values to determine variations between the new average values and the previous values from the same sensor using the computer device; and providing a determination of risk assessment by categorizing the variation between the new average values and the previous values and identifying if a sensor value is within or without a pre-determined default value range, wherein if all variation between the new average values and the previous values are within the default value range, the system stores the new average values, and continues obtaining and recording data from the sensors, and wherein if a variation is outside of the default value range it triggers pre-set commands to execute and perform additional operations to determine changes in the structure that affect structural integrity.

2. The method of claim 1, wherein the obtaining and recording of data is further acquired from a piezo electric device sensor.

3. The method of claim 1, wherein the monitoring unit further comprises an audio speaker, a cellular communication system, or a Wi-Fi system.

4. The method of claim 1, further comprising:
comparing average default values with pre-determined default values that specify minimum and maximum value ranges for each sensor;
changing the minimum and maximum value ranges manually or using machine learning technology;
wherein when the average values for a sensor are identified to be outside a default value range, a pre-determined command schedule is initiated, wherein an analysis process is executed to determine power and communication capabilities, and data is provided to an external computing device using Wifi, RF, Bluetooth, Cellular, Satellite and/or manual extraction from the computer device in order to execute a secondary analysis to determine the integrity of the structure; and when the average values for all sensors are identified to be within a default value range, the system resets and returns to normal operations.

5. The method of claim 1 to measure structural integrity further including a remote computer device executing operations comprising the following steps:
receiving sensor data acquired before, during and after the natural disaster;
executing an analysis using data from the sensors and data acquired from third party databases, and structural data from a user profile;
performing an analysis categorizing the structure after the natural disaster using a pre-determined risk assessment table;
wherein the pre-determined risk assessment table has low risk, medium risk and high risk categories which are communicated to a user.

6. The method of claim 1 wherein an analysis is performed from the computing device and/or from a second computer device outside the structure, or a combination of both.

7. The method of claim 1, wherein true values from sensor data acquisitions are used in addition to average values.

8. The method of claim 1, wherein data is processed and analyzed in the computing device, or an ancillary computing device located at the structure.

9. The method of claim 1, wherein a person in the structure containing the monitoring unit is able to communicate through the monitoring unit with a remotely located person using communication components in the monitoring unit.

10. The method of claim 1, wherein the monitoring unit includes a means for invoicing a user for services offered by the monitoring unit.

11. The method of claim 1, wherein the monitoring unit includes a system for services offered as a subscription.

12. The method of claim 1, wherein user interaction with the monitoring unit is accessed over a network and is tracked so as to record user behavior, how frequently the service is used, and what kinds of key strokes are employed to make use of such service, being used for feedback for further software development and for vendor sponsoring activities.

13. The method of claim 1, wherein the monitoring unit includes a display area for targeted advertising.

14. The method of claim 1, wherein firmware at the monitoring unit or computing device can be updated and commands can be changed at any time.

15. The method of claim 1, wherein the obtaining and recording of data is further acquired from a micro-controlled acoustic sensor which records sound waves in the structure which are compared with sound patterns that originate from the breakage of wood, metal, concrete, glass, stone, and/or brick in order to assess damage in a structure.

16. The method of claim 1 further comprising identifying mobile electronic devices within or around a structure that has been determined unsafe in an analysis process wherein,
users register the mobile electronic devices online, and; in the event the system is triggered by an incident, the system recognizes the mobile electronic devices if they are in the vicinity of the monitoring unit.

17. The method of claim 1, wherein the system is in communication with a third party database.

18. The method of claim 1, wherein the system further detects material fatigue.

19. The method of claim 1, wherein the risk assessment includes a low risk assessment, a medium risk assessment or a high risk assessment, wherein specific guidelines are attached to each assessment.

20. The method of claim 1, wherein the monitoring unit further comprises an acoustic sensor.

21. The method of claim 20, wherein the acoustic sensor identifies human voices to enable notification to people in the room that has been experienced an earthquake.

22. The method of claim 20, wherein a combination of data from the acoustic sensor and the infrared sensor identifies if bodies in the room are human or animals.

23. The method of claim 1, wherein the natural disaster is a local earthquake.

24. The method of claim 1, wherein the gas sensor is a carbon monoxide sensor.

* * * * *